(12) United States Patent  
Saito et al.

(10) Patent No.: US 7,717,225 B2
(45) Date of Patent: May 18, 2010

(54) MOTOR-DRIVEN STEERING ASSIST APPARATUS

(75) Inventors: Mitsuo Saito, Tochigi (JP); Masanobu Miyazaki, Tochigi (JP); Koichi Hata, Tochigi (JP)

(73) Assignee: Showa Corporation, Saitama (JP)

( * ) Notice: Subject to any disclaimer, the term of this patent is extended or adjusted under 35 U.S.C. 154(b) by 148 days.

(21) Appl. No.: 11/073,557

(22) Filed: Mar. 7, 2005

(65) Prior Publication Data

US 2006/0042862 A1 Mar. 2, 2006

(30) Foreign Application Priority Data

Aug. 27, 2004 (JP) ............... 2004-247831

(51) Int. Cl.
*B62D 5/04* (2006.01)
(52) U.S. Cl. .................. 180/444; 180/443; 180/446
(58) Field of Classification Search ............ 180/444, 180/443, 446
See application file for complete search history.

(56) References Cited

U.S. PATENT DOCUMENTS

| | | | |
|---|---|---|---|
| 4,865,143 A * | 9/1989 | Hashimoto et al. ......... 180/443 |
| 5,020,616 A | 6/1991 | Yagi | |
| 5,445,238 A | 8/1995 | Chikuma | |
| 5,482,128 A | 1/1996 | Takaoka | |
| 6,454,043 B2 * | 9/2002 | Fujita et al. ................. 180/444 |
| 6,805,017 B2 * | 10/2004 | Chikaraishi et al. ...... 74/388 PS |
| 6,848,530 B2 * | 2/2005 | Tani ........................... 180/292 |
| 6,854,556 B1 * | 2/2005 | Yamamoto et al. .......... 180/444 |
| 7,096,988 B2 * | 8/2006 | Moriyama ................... 180/190 |
| 2002/0029923 A1 * | 3/2002 | Tanioka ...................... 180/444 |
| 2002/0040608 A1 * | 4/2002 | Kamiya et al. ......... 73/862.334 |
| 2002/0189892 A1 * | 12/2002 | Appleyard ................... 180/444 |
| 2003/0136604 A1 * | 7/2003 | Yamanaka et al. ........... 180/444 |
| 2004/0060766 A1 * | 4/2004 | Hayakawa et al. .......... 180/444 |
| 2004/0163880 A1 * | 8/2004 | Hama et al. ................. 180/444 |
| 2005/0065686 A1 * | 3/2005 | Kohno et al. ................ 701/41 |
| 2006/0108174 A1 * | 5/2006 | Saito et al. .................. 180/444 |

FOREIGN PATENT DOCUMENTS

| JP | 2002-225731 | 8/2002 |
|---|---|---|
| JP | 2004-132516 | 4/2004 |
| JP | 2003-14055 | 9/2004 |

\* cited by examiner

*Primary Examiner*—Lesley Morris
*Assistant Examiner*—Maurice Williams
(74) *Attorney, Agent, or Firm*—Orum & Roth LLC

(57) ABSTRACT

A motor-driven steering assist apparatus includes a single unit body covered by first to third housings, an upper end portion of an input shaft and a torque sensor are supported to the first housing, an upper end portion of an output shaft, an electric motor, a worm gear and a worm wheel are supported to the second housing, and a lower end portion of the output shaft is supported to the third housing.

3 Claims, 5 Drawing Sheets

MOTOR-DRIVEN STEERING ASSIST APPARATUS

BACKGROUND OF THE INVENTION

1. Field of the Invention

The present invention relates to a motor-driven steering assist apparatus.

2. Description of the Related Art

In a motor-driven steering assist apparatus of a buggy vehicle or the like, as described in Japanese Patent Application Laid-open No. 62-46790 (patent document 1), there is a structure which is interposed between a steering wheel and a tire wheel side steering member, and which assists steering force applied to the steering wheel by a driver on the basis of a torque generated by an electric motor.

In the motor-driven steering assist apparatus described in the patent document 1, a piping system applied to a hydraulic motor becomes complicated so as to deteriorate mounting characteristics, and a hydraulic pump and a tank are required so as to make the structure large in size and heavy in weight.

SUMMARY OF THE INVENTION

An object of the present invention is to improve the mounting characteristics and achieve compact size and low weight in a motor-driven steering assist apparatus.

In accordance with the present invention, there is provided a motor-driven steering assist apparatus interposed between a steering wheel and a tire wheel side steering member which assists steering force applied to the steering wheel by a driver on the basis of torque generated by an electric motor. The new structure includes an input shaft to which the steering wheel is connected and an output shaft to which the tire wheel side steering member is connected. A torque sensor is provided between the input shaft and the output shaft. An electric motor is driven in correspondence to a detected torque of a torque sensor. A worm gear is coupled to a rotating shaft of the electric motor. A worm wheel which is coupled to the output shaft is engaged with the worm gear.

The input shaft, the output shaft, the torque sensor, the electric motor, the worm gear and the worm wheel is installed within a single unit covered by first to third housings.

An upper end portion of the input shaft and the torque sensor are supported to the first housing. An upper end portion of the output shaft, the electric motor, the worm gear and the worm wheel are supported to the second housing. A lower end portion of the output shaft is supported to the third housing.

BRIEF DESCRIPTION OF THE DRAWINGS

The present invention will be more fully understood from the detailed description given below and from the accompanying drawings which should not be taken to be a limitation on the invention, but are for explanation and understanding only. The drawings.

DESCRIPTION OF THE PREFERRED EMBODIMENTS

Figure 1:
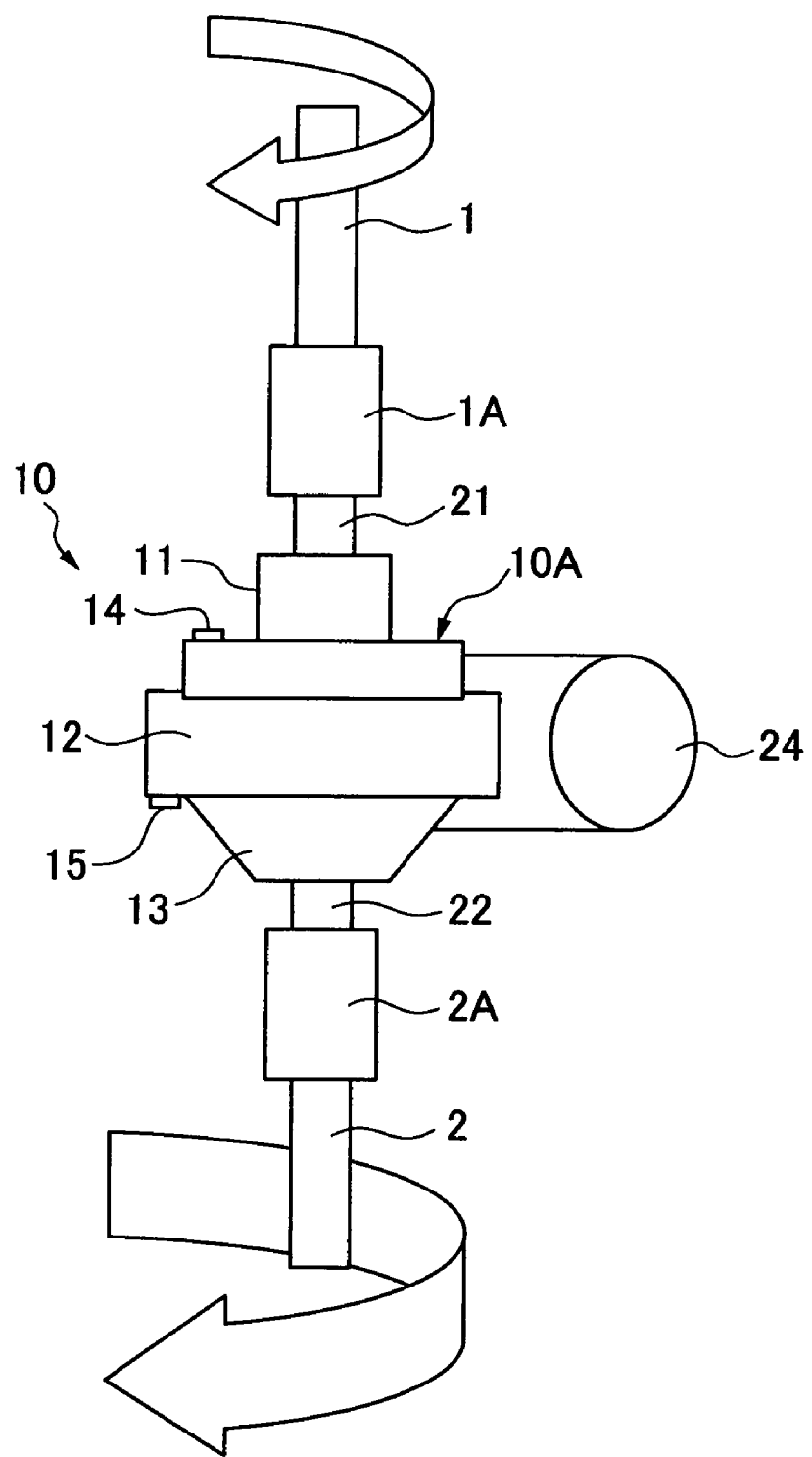
FIG. 1 is an entire schematic view showing a motor-driven steering assist apparatus.
Figure 2:
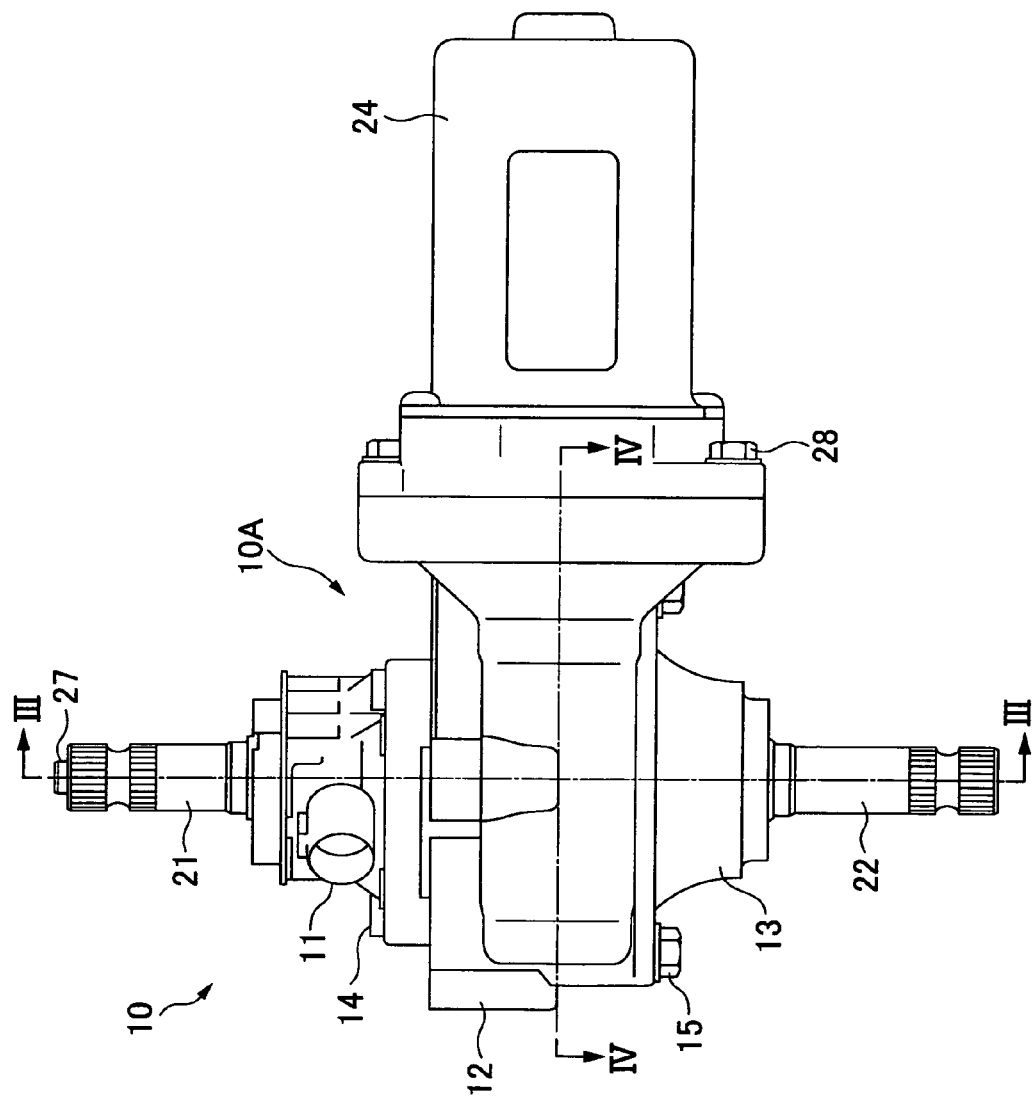
FIG. 2 is a front elevational view showing the motor-driven steering assist apparatus.

As shown in FIG. 1, a motor-driven steering assist apparatus 10 is applied to a vehicle, for example, a buggy vehicle, a snow mobile or the like. The apparatus is interposed between a steering wheel side steering member 1 and a tire wheel side steering member 2, and assists steering force applied to the steering wheel by a driver on the basis of torque generated by an electric motor 24.

The motor-driven steering assist apparatus 10 includes a single unit body 10A covered by first to third housings 11 to 13, as shown in FIGS. 1 to 4. The unit body 10A has an input shaft 21, an output shaft 22, a torque sensor 23, an electric motor 24, a worm gear 25 and a worm wheel 26 built-in.

Figure 3:
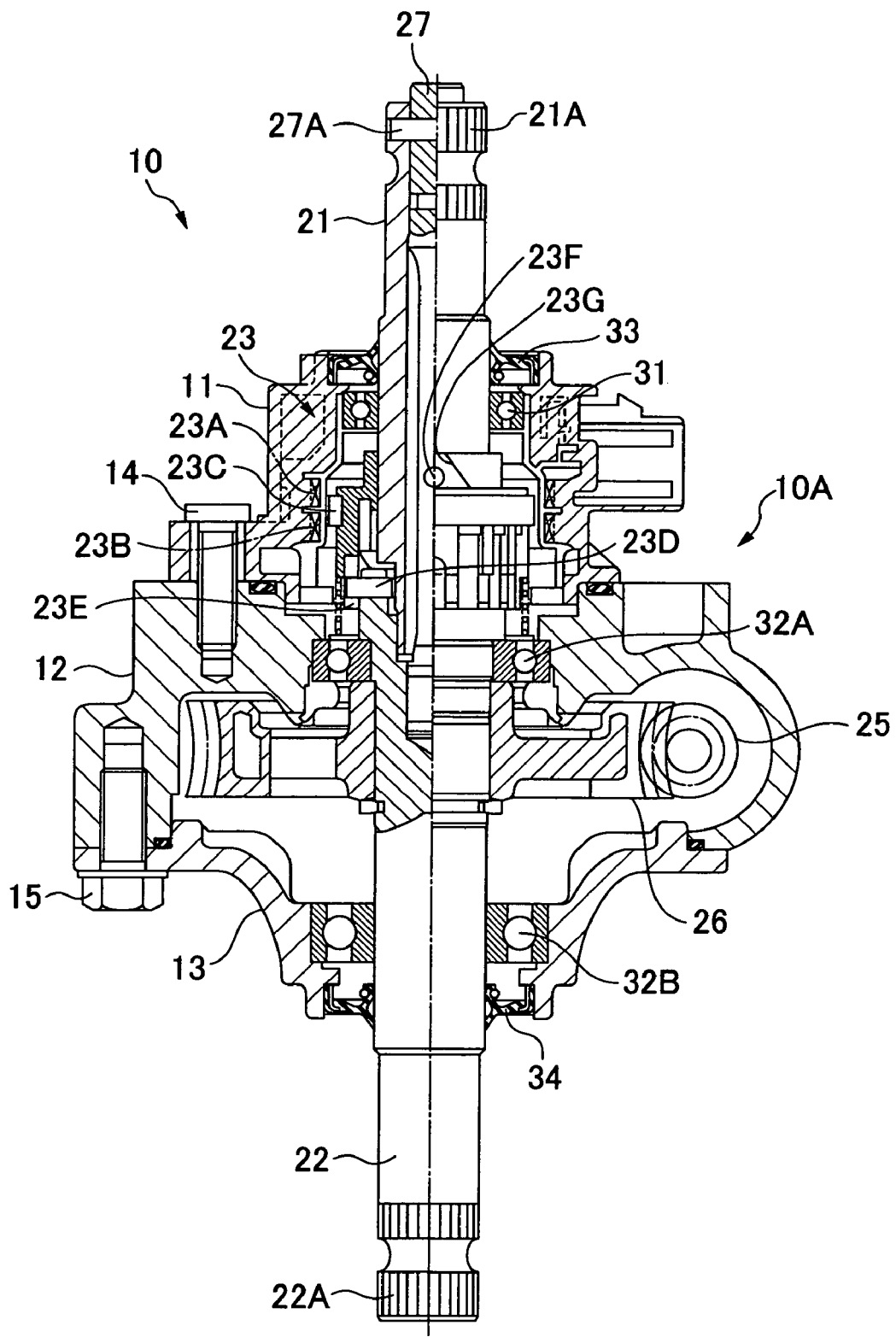
FIG. 3 is a cross sectional view along a line III-III in FIG. 2.

The motor-driven steering assist apparatus 10 includes an upper end portion of the input shaft 21 to which the steering wheel side steering member 1 is connected by a connecting device 1A which is supported to the first housing 11 by a bearing 31 (FIG. 3). Upper and lower end portions of the output shaft 22 to which the tire wheel side steering member 2 is connected by a connecting device 2A are supported to the second housing and the third housing 13 by upper and lower bearings 32A and 32B (FIG. 3). The input shaft 21 is provided with a serration 21A for connection to the connecting device 1A in an upper end outer peripheral portion, and the output shaft 22 is provided with a serration 22A for connection to the connecting device 2A in a lower end outer peripheral portion. A torsion bar 27 is inserted in to a hollow portion of the input shaft 21. One end of the torsion bar 27 is coupled to the input shaft 21 by a coupling pin 27A, and the other end of the torsion bar 27 is inserted to a hollow portion of the output shaft 22 so as to be connected by serration.

A torque sensor 23 is provided with two detecting coils 23A and 23B surrounding a cylindrical core 23C engaged with the input shaft 21 and the output shaft 22, in the first housing 11, as shown in FIG. 3. The core 23C is provided with a vertical groove 23E engaging with a guide pin 23D of the output shaft 22 so as to be movable only in an axial direction, and is provided with a spiral groove 23G engaging with a slider pin 23F of the input shaft 21.

Accordingly, when steering torque applied to the steering wheel is applied to the input shaft 21, and a relative displacement in a rotation direction is generated between the input shaft 21 and the output shaft 22 on the basis of an elastic torsional deformation of the torsion bar 27, the displacement in the rotation direction of the input shaft 21 and the output shaft 22 displaces the core 23C in an axial direction, and an inductance of the detecting coils 23A and 23B caused by a magnetic change around the detecting coils 23A and 23B due to the displacement of the core 23C is changed. When the core 23C moves close to the input shaft 21, the inductance of the detecting coil 23A to which the core 23C moves close is increased, and the inductance of the detecting coil 23B from which the core 23C moves apart is reduced, whereby it is possible to detect steering torque on the basis of the change of the inductance.

Figure 4:
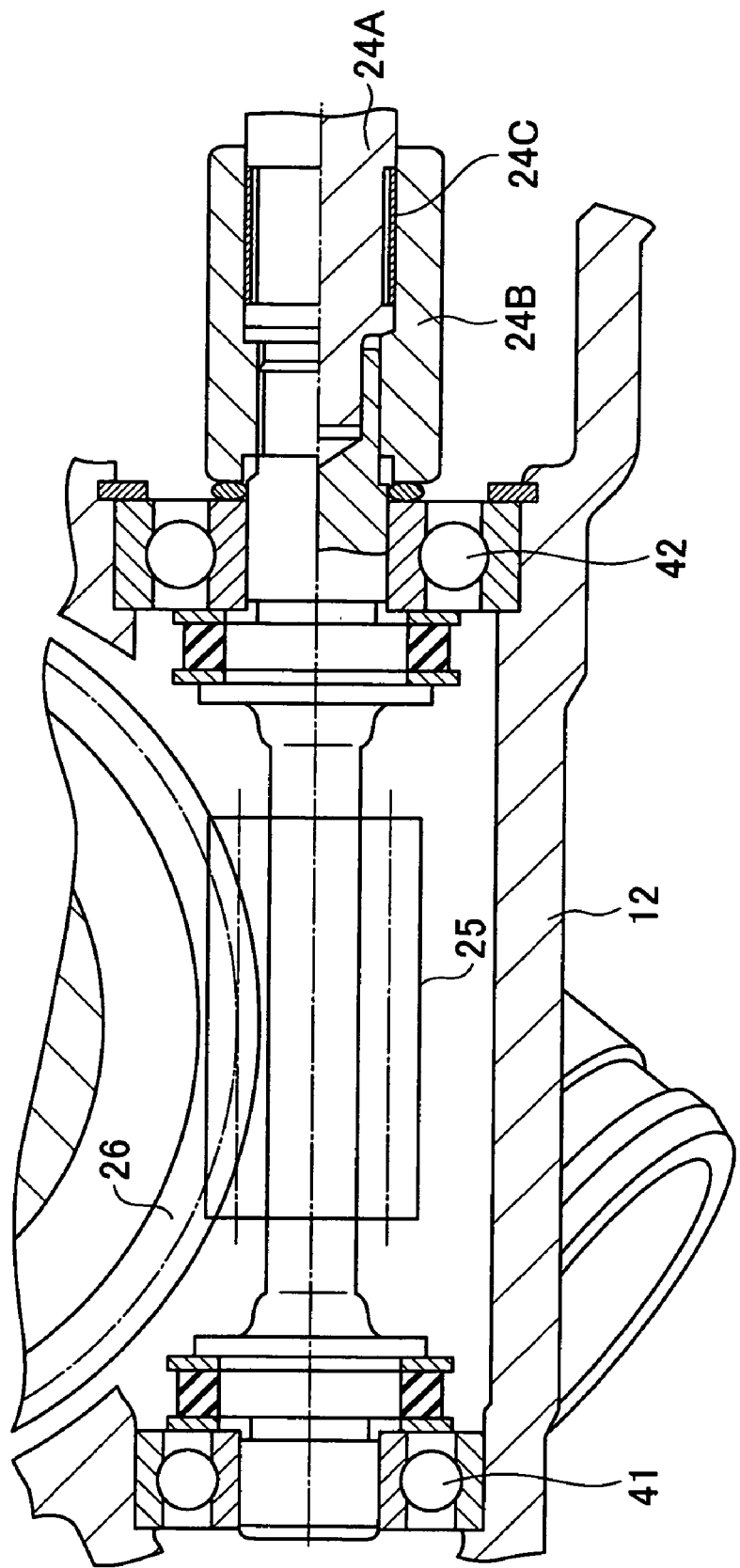
FIG. 4 is a cross sectional view along a line IV-IV in FIG. 2.
Figure 5:
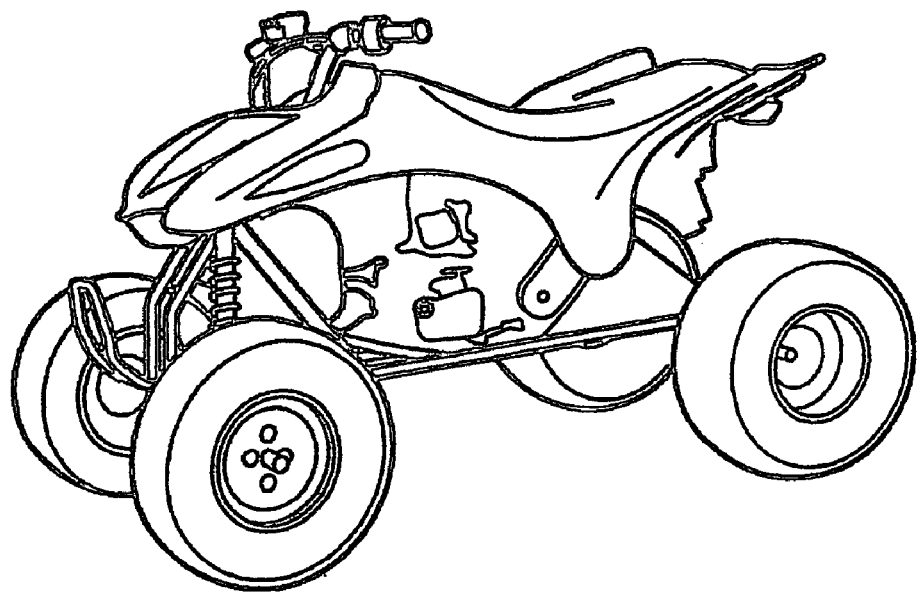
FIG. 5 is a figure illustrating the claimed buggy vehicle.
Figure 6:
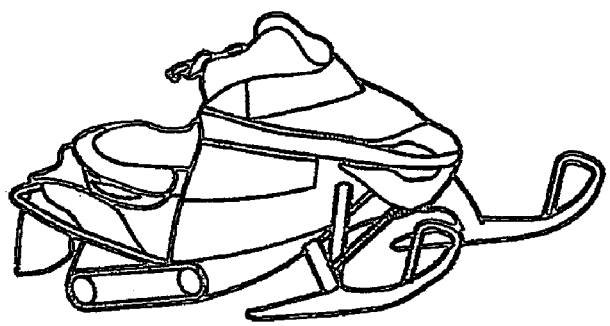
FIG. 6 is a figure illustrating the claimed snowmobile.

The electric motor 24 is attached and supported to the second housing 12 by a mounting bolt 28, and is driven by a controller (not shown) in correspondence to the detected torque of the torque sensor 23. A worm gear 25 is coupled to a rotation shaft 24A of the electric motor 24 by a joint 24B, and the worm wheel 26 engaging with the worm gear 25 is fixed to the output shaft 22. The worm gear 25 is supported at both ends to the second housing 12 by right and left bearings 41 and 42, as shown in FIG. 4. The worm wheel 26 is fixed to the output shaft 22 just below an upper bearing 32A in the output shaft 22, in an inner portion of the second housing 12.

In this case, the joint 24B coupling the rotation shaft 24A of the electric motor 24 and the worm gear 25 is structured such that a torque limiter 24C constituted by an elastic ring is interposed in a fitting gap between both of the elements (FIG. 4). The torque limiter 24C keeps coupling the rotation shaft 24A and the joint 24B under normal torque conditions of the motor-driven steering assist apparatus 10, makes them slip under abnormal torque conditions, and does not transmit the torque of the electric motor 24 to a side of the joint 24B.

Accordingly, in the motor-driven steering assist apparatus, an integral unit body 10A is structured by supporting the upper end portion of the input shaft 21 and the torque sensor 23 to the first housing 11, supporting the upper end portion of the output shaft 22, the electric motor 24, the worm gear 25 and the worm wheel 26 to the second housing 12, supporting the lower end portion of the output shaft 22 to the third housing 13, coupling the first housing 11 and the second housing 12 by the mounting bolt 14, and coupling the second housing 12 and the third housing 13 by the mounting bolt 15 (FIG. 3). An oil seal 33 is attached in a sealing manner to an upper opening portion of the bearing 31 in the first housing 11, and an oil seal 34 is attached in a sealing manner to a lower opening portion of the bearing 32B in the third housing 13 (FIG. 3).

In accordance with the motor-driven steering assist apparatus 10, the steering torque applied to the steering wheel is detected by the torque sensor 23, the electric motor 24 is driven by the detected torque, and the torque generated by the electric motor 24 is transmitted to the output shaft 22 via the worm gear 25 and the worm wheel 26. Accordingly, the generated toque of the electric motor 24 can be used as an assist force with respect to the steering force which the driver applies to the steering wheel.

In accordance with the present embodiment, the following operations and effects can be achieved.

(a) The motor-driven steering assist apparatus 10 which includes the single unit body 10A, can be easily attached to the applied vehicle or the like by connecting the input shaft 21 to the steering wheel side steering member 1 and connecting the output shaft 22 to the tire wheel side steering member 2, and resultingly has a high general-purpose application to various vehicles or the like.

(b) Since the torque sensor 23 is provided in the first housing 11, and the worm wheel 26 and the like are provided in the second housing 12, it is easy to avoid grease which has been applied to the worm wheel 26 and the like from entering into the side of the torque sensor 23.

(c) Since the upper end portion of the output shaft 22 is supported to the second housing 12, and the lower end portion of the output shaft 22 is supported to the third housing 13, it is possible to secure a distance between the bearing 32A in the upper end portion of the output shaft 22 and the bearing 32B in the lower end portion, and it is possible to stably support the output shaft 22.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven steering assist apparatus, comprising:
an input shaft to which a steering wheel is connected;
an output shaft to which a tire wheel side steering member is connected;
a torque sensor disposed between the input shaft and the output shaft;
an electric, motor which is driven in correspondence to a detected torque of a torque sensor;
a worm gear which is coupled to a rotating shaft of the electric motor;
a worm wheel which is coupled to the output shaft, and is engaged with the worm gear;
the input shaft, the output shaft, the torque sensor, the electric motor, the worm gear and the worm wheel being installed within a single unit covered by first to third housings,
wherein an upper end portion of the input shaft and the torque sensor are supported by three or fewer points of support between the input shaft, the output shaft, and the housing, to the first housing by a first support disposed at an upper point in the first housing; an upper end portion of the output shaft, the electric motor, the worm gear and the worm wheel are supported to the second housing by a second support disposed at an interface between said first and second housings; and a lower end portion of the output shaft is supported to the third housing by a third support disposed at a lower point at an interface between said second and third housings, at least a portion of said third support extending below a lowest point of said second housing, the second housing being disposed between the first housing and the third housing, the lower point being disposed between the upper point and an area of the output shaft connectable to the tire wheel side steering member,
a terminal end of the output shaft extending beyond a lowermost point of said third housing,
wherein the output shaft is structured such that an upper end portion is supported by an upper bearing provided in the second housing, and a lower end portion is supported by a lower bearing provided in the third housing, and the worm wheel is fixed to the output shaft just below the bearing provided in the second housing in the output shaft, in an inner portion of the second housing.

2. A motor-driven steering assist apparatus as claimed in claim 1, wherein the motor-driven steering assist apparatus is applied to a buggy vehicle.

3. A motor-driven steering assist apparatus as claimed in claim 1, wherein the motor-driven steering assist apparatus is applied to a snowmobile.

* * * * *